United States Patent [19]

Mealey

[11] 4,198,848
[45] Apr. 22, 1980

[54] LEVEL GAUGE CALIBRATION APPARATUS

[76] Inventor: Daniel R. Mealey, 10601 Coloma Rd., Rancho Cordova, Calif. 95670

[21] Appl. No.: 888,940

[22] Filed: Mar. 22, 1978

[51] Int. Cl.² .................................................. G01F 25/00
[52] U.S. Cl. ..................................................... 73/1 H
[58] Field of Search ........................ 73/1 H, 4 R, 439

[56] References Cited
U.S. PATENT DOCUMENTS

| | | | |
|---|---|---|---|
| 1,822,458 | 9/1931 | Rowland | 73/439 |
| 3,394,590 | 7/1968 | Napolitano | 73/4 R |
| 3,909,205 | 9/1975 | Jones | 73/4 R |

*Primary Examiner*—S. Clement Swisher
*Attorney, Agent, or Firm*—Blair, Brown & Kreten

[57] ABSTRACT

Disclosed herein is a process simulator for substituting a vessel that is to be measured. In any process where the liquid level is to be measured by a pressure instrument and where a bubble system is used to obtain the measurement, the process simulator provides an accurate comparative apparatus. It includes a tank containing the liquid which communicates with a bubble pipe removeably inserted into the tank in which the bubble pipe communicates with an air line. Seals are provided at the intersection of the bubble pipe and the tank to provide a sure fit and a scale indicator is disposed upon the tank to provide a technique for aligning comparative levels on the bubble pipe with their marks thereon.

6 Claims, 3 Drawing Figures

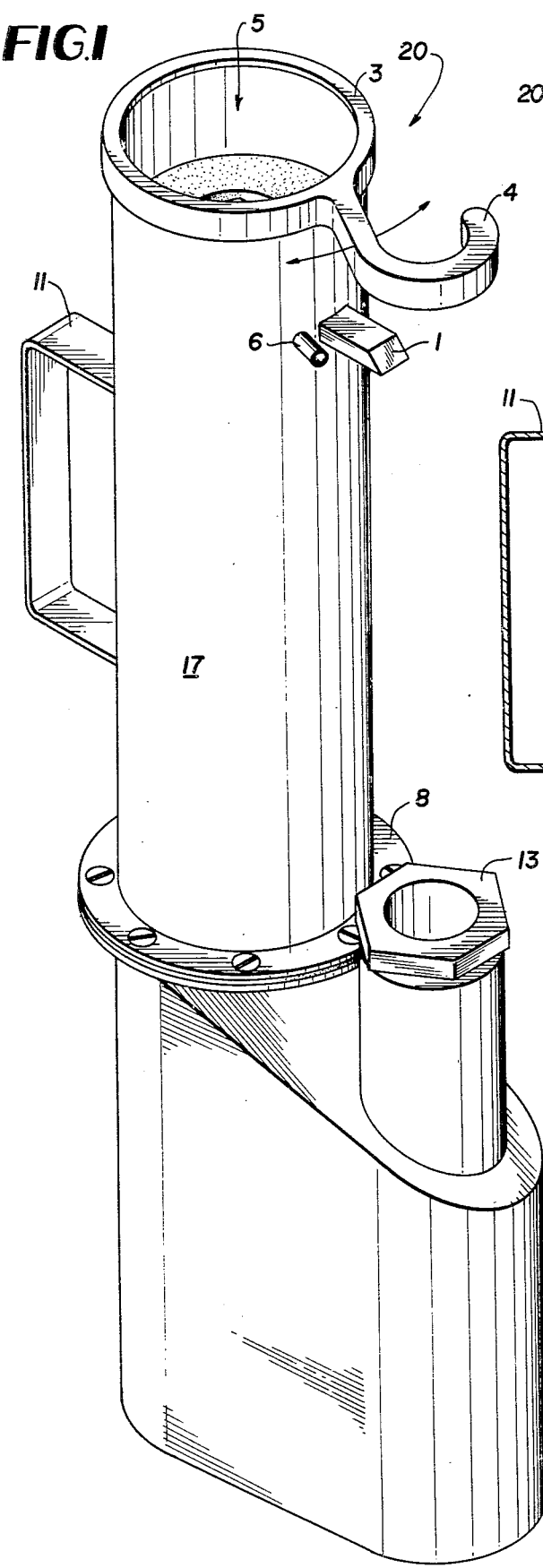
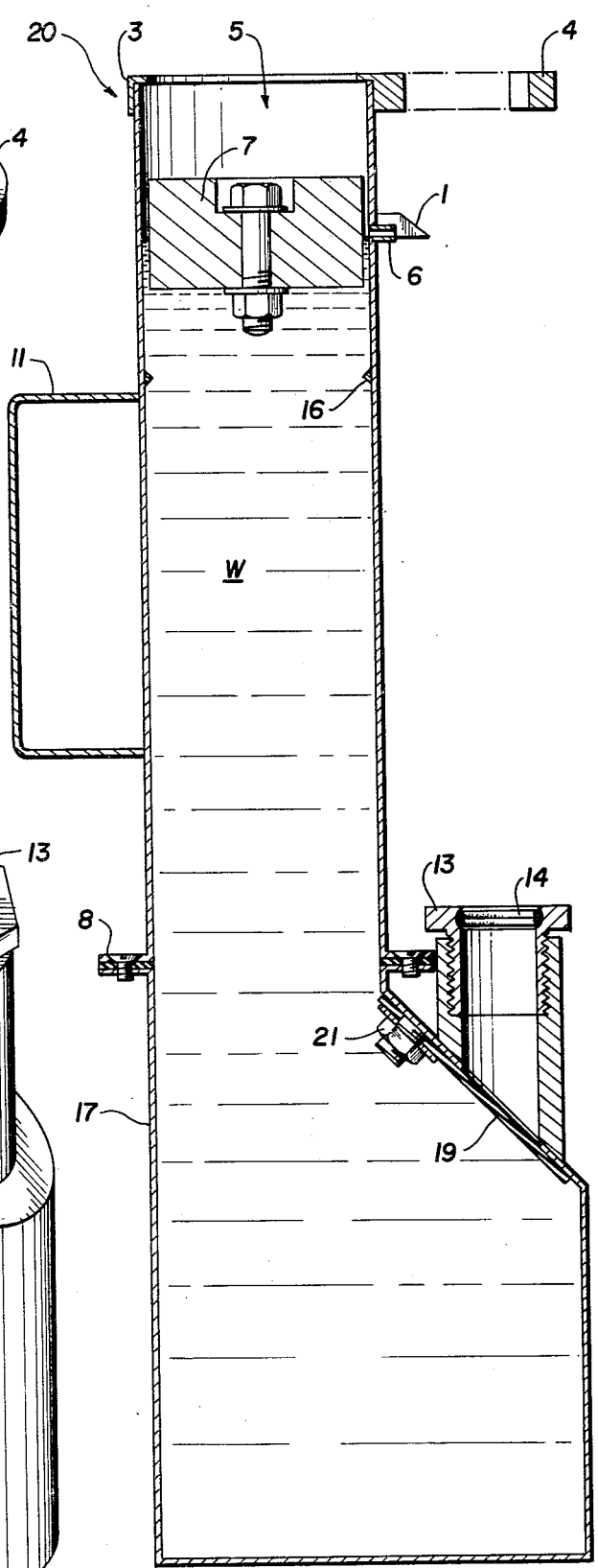

LEVEL GAUGE CALIBRATION APPARATUS

BACKGROUND OF THE INVENTION

In testing operations where a vessel is to be measured, a surrogate can provide an accurate means for correlating a liquid level with a corresponding pressure instrument. Prior art devices of which applicant is aware includes U.S. Pat. No. 1,822,458 to Rowland, U.S. Pat. No. 2,693,113 to Hejduk, U.S. Pat. No. 2,947,162 to Davis, U.S. Pat. No. 3,133,435 to Lewis, U.S. Pat. No. 3,267,719 to Wagner and U.S. Pat. No. 3,545,278 to Chandler.

While the cited references show various test instruments for calibrating other measuring devices none show the structure or concept of the following invention.

SUMMARY OF THE INVENTION

Accordingly the following description is directed to a technique whereby the process simulator of the present application replaces the vessel to be measured and provides a correspondence between liquid level and air pressure where a purge or bubble system is used to obtain the readings.

Accordingly an object of this invention is to provide a process simulator which replaces the vessel under measurement.

Another object of this invention contemplates providing a process simulator where a correlation between air pressure and liquid level can be readily made by virtue of associated pointers and indicators.

These and other objects will be made manifest when considering the following detailed drawings and specification.

BRIEF DESCRIPTION OF THE DRAWINGS

FIG. 1 shows a perspective view of the apparatus according to the present invention;

FIG. 2 is a sectional view of the apparatus according to FIG. 1; and

DESCRIPTION OF THE PREFERRED EMBODIMENT

Figure 3:
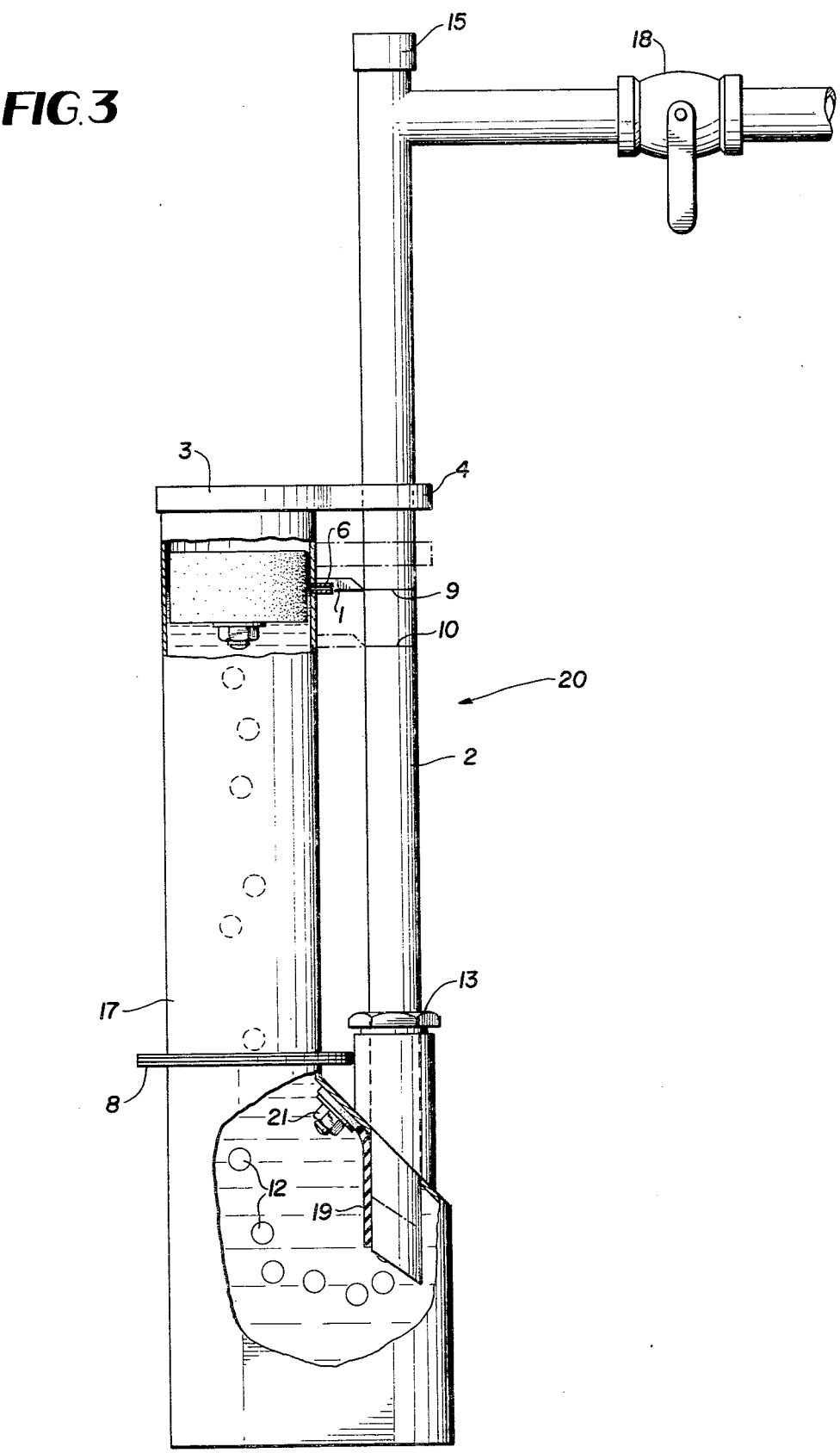
FIG. 3 is a side view of the apparatus shown in FIGS. 1 and 2 in which the bubble tube is included and there is a cut away portion to show the effect of the measuring.

Referring to the drawings now wherein like reference numerals refer to like parts throughout reference numeral 20 is generally directed to a process simulator according to the present invention.

It may generally be regarded as being an apparatus 20 comprised of the following components. An air valve 18 communicates with the bubble pipe 2 which is placed within the tank 17 through a bushing 13 having an inner surface of substantially the same diameter as the outer surface of the bubble pipe 2 and further provided with O-rings or seals 14 to assure a good tight seal. When the bubble pipe 2 is inserted far enough within the tank 17 a flapper type check valve 19 is displaced to allow communication of the bubbler tube into the liquid filled tank 17. The flapper 19 is fastened to the tank 17 by means of nut 21. The tank is comprised of two major portions an upper chamber and a lower chamber connected by flange member 8. The top portion of tank 17 has a handle 11 and above the handle is an open top ring 3 which communicates with a clip 4 so as to surround the bubble pipe and provide support therefore. Disposed therebelow is an index pointer 1 having a water level hole 6 adjacent to and on the same plane and within the tank 17 is a weighted float 7 which rides on the surface of the water. In operation therefore with valve 18 opened, the bubble pipe 2 is inserted into the bushing 13 far enough to open flapper valve 19. The index blade 1 is aligned with a mark on the bubble tube 9 indicating the high mark and the first observation takes place. If water is emitted from hole E wait until it stops and then observe the measuring instrument to see if it is at its predetermined setting. If no water appears then add water through the top opening 5 until water is emitted at the hole then wait until it stops. If the instrument needs adjusting this is the proper time to do so. The process is then repeated with the indicator blade 1 aligned with the lower notch 10 and the process is repeated to determine whether the calibrations are correct. If the span of the instrument needs adjusting repeat procedure until the instrument is calibrated. It is to be noted that before equilibrium is reached, bubbles 12 may be introduced into the tank and will not provide any misreading since water is added to the open top 5 until water is seen to come out of the water level hole 6.

Having thus described the invention it will be apparent that numerous structural modifications are contemplated as being a part of this invention as specified hereinabove and defined by the claims.

What is claimed is:

1. A process simulator comprising a bubble pipe, a tank connected to said bubble pipe so as to define a U-shaped configuration, an air valve connected to said bubble pipe remote from said tank, indicia described on said bubble pipe, an index pointer disposed upon said tank adapted to coalesce with said indicia on said bubble pipe, a water level hole adjacent to said indicator, and means to adjust the liquid level within the tank to provide a comparative reading.

2. The device of claim 1 wherein said means comprises a float disposed within said tank, liquid within said tank, and an opening to permit the additional ingress of water.

3. The device of claim 2 wherein a handle is disposed upon said tank.

4. The device of claim 3 wherein the tank is comprised of an upper portion and a lower portion fastened together by a flange connection.

5. The device of claim 4 wherein said bubble tube communicates with said tank through a check valve.

6. The device of claim 5 wherein the area where the bubble pipe enters the tank is sealed by means of an O-ring or seals.

* * * * *